United States Patent
Bauer et al.

(10) Patent No.: US 10,047,813 B2
(45) Date of Patent: Aug. 14, 2018

(54) BRACKET FOR ANTI-LOCK BRAKING SYSTEM SENSOR

(71) Applicant: HENDRICKSON USA, L.L.C., Itasca, IL (US)

(72) Inventors: Eric Bauer, Canton, OH (US); Richard Rofe, Massillon, OH (US); Jared Haney, Magnolia, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/453,957

(22) Filed: Mar. 9, 2017

(65) Prior Publication Data
US 2017/0261056 A1 Sep. 14, 2017

Related U.S. Application Data

(60) Provisional application No. 62/306,875, filed on Mar. 11, 2016.

(51) Int. Cl.
*B60T 8/32* (2006.01)
*F16D 66/00* (2006.01)
*B23P 15/00* (2006.01)
*B60T 8/171* (2006.01)
*B60T 17/04* (2006.01)

(52) U.S. Cl.
CPC .............. *F16D 66/00* (2013.01); *B23P 15/00* (2013.01); *B60T 8/171* (2013.01); *B60T 8/329* (2013.01); *B60T 17/04* (2013.01); *B60Y 2200/142* (2013.01); *F16D 2066/003* (2013.01)

(58) Field of Classification Search
CPC .... F16D 66/00; F16D 2066/003; B60T 8/329; B60T 8/72; B60T 8/74; B60T 8/76; B60Y 2200/142; G01D 11/30
USPC .... 248/230.8, 200, 230.1, 228.8, 58, 49, 60, 248/63, 59, 62, 74.3, 74.2, 229.17; 180/209, 296
See application file for complete search history.

(56) References Cited

U.S. PATENT DOCUMENTS

| | | | | |
|---|---|---|---|---|
| 449,411 A | * | 3/1891 | Hannah | F16D 66/024 200/61.4 |
| 654,817 A | * | 7/1900 | Taft | F16L 3/1233 248/302 |
| 1,085,421 A | * | 1/1914 | Hiller | F16L 3/1233 24/20 R |
| 1,140,145 A | * | 5/1915 | Finger | B05B 15/063 248/175 |

(Continued)

FOREIGN PATENT DOCUMENTS

WO 2001079046 A2 10/2001
WO 2015047164 A1 4/2015

*Primary Examiner* — Nkeisha Smith
(74) *Attorney, Agent, or Firm* — Dureska & Moore, LLC; David P. Dureska; Greg Strugalski (57) ABSTRACT

A bracket for mounting an anti-lock braking system sensor to a vehicle axle adjacent to a tone ring. The bracket includes a tubular body portion with a surface defining an opening for receiving the anti-lock braking system sensor. A pair of legs, each extending from the body portion. A pair of feet, each define an end portion of a respective one of the pair of legs. Each of the pair of feet is adapted for attachment to an exterior surface of the vehicle axle. The body portion, the pair of legs and the pair of feet are integrally formed as one-piece from powdered metal.

20 Claims, 6 Drawing Sheets (56) References Cited

U.S. PATENT DOCUMENTS

| | | | | |
|---|---|---|---|---|
| 2,826,385 | A * | 3/1958 | Osborn | F16L 3/12 24/20 R |
| 3,510,918 | A | 5/1970 | Oetiker | |
| 4,037,690 | A | 7/1977 | Fisher et al. | |
| 4,090,099 | A * | 5/1978 | Daffron | B60T 8/171 188/181 R |
| 4,132,293 | A | 1/1979 | Jovick | |
| 4,153,228 | A * | 5/1979 | Delserro | F16L 3/123 24/19 |
| 4,428,893 | A * | 1/1984 | Cummings, Jr. | B01F 3/0412 248/74.3 |
| 4,877,209 | A | 10/1989 | Gary | |
| 4,901,562 | A | 2/1990 | Beakas et al. | |
| 4,941,630 | A * | 7/1990 | Albano | F16B 15/00 248/62 |
| 5,423,501 | A * | 6/1995 | Yu | A01G 17/08 248/61 |
| 5,573,211 | A * | 11/1996 | Wu | B62B 1/06 248/230.8 |
| 5,704,692 | A | 1/1998 | Purdy et al. | |
| 6,238,015 | B1 | 5/2001 | Garcia et al. | |
| 6,286,638 | B1 | 9/2001 | Rowan et al. | |
| 6,523,425 | B1 * | 2/2003 | Kubik | B60T 8/171 73/493 |
| 6,536,719 | B2 * | 3/2003 | Rivera | F16L 3/08 24/16 PB |
| 7,125,294 | B2 * | 10/2006 | Bruno | H05K 3/303 439/876 |
| 7,462,278 | B2 * | 12/2008 | Meritt-Powell | B01D 29/27 15/1.7 |
| 7,559,521 | B2 * | 7/2009 | White | B23P 15/00 188/181 A |
| 7,708,124 | B1 * | 5/2010 | Rackers | B60B 35/16 188/206 A |
| 7,789,360 | B2 * | 9/2010 | Qualy | F16M 13/02 248/218.4 |
| 8,307,514 | B2 * | 11/2012 | Clark, Sr. | E05D 11/00 16/254 |
| 2002/0175258 | A1 | 11/2002 | White et al. | |
| 2003/0226412 | A1 * | 12/2003 | Rumminger | F01N 13/008 73/866.5 |
| 2004/0100144 | A1 | 5/2004 | Naslund et al. | |
| 2011/0133046 | A1 * | 6/2011 | Lemerise | G01D 11/30 248/230.8 |
| 2012/0247885 | A1 * | 10/2012 | Lantz | F16D 65/00 188/205 R |
| 2012/0298808 | A1 * | 11/2012 | Lockwood | F16B 12/10 248/49 |
| 2015/0337989 | A1 * | 11/2015 | Bolton | F16M 13/02 248/74.3 |
| 2016/0076610 | A1 * | 3/2016 | White | F16D 65/00 188/73.39 |
| 2017/0066426 | A1 * | 3/2017 | Bowyer | A61K 9/10 |

\* cited by examiner

BRACKET FOR ANTI-LOCK BRAKING SYSTEM SENSOR

CROSS-REFERENCE TO RELATED APPLICATIONS

This application claims the benefit of U.S. Provisional Patent Application Ser. No. 62/306,875 filed on Mar. 11, 2016.

TECHNICAL FIELD

The subject matter of the invention generally relates to anti-lock braking systems. The subject matter particularly relates to a bracket for mounting an anti-lock braking system sensor to an axle of a heavy-duty vehicle.

BACKGROUND

Braking systems for vehicles improved over time. This is especially the case for heavy-duty vehicles in order to comply with government regulations or to provide safer heavy-duty vehicles. Heavy-duty vehicles include trucks, tractor-trailers or semi-trailers and trailers. A heavy-duty vehicle has one or more axles with tire and wheel assemblies mounted on respective opposite ends of each axle. A tire and wheel assembly typically includes a pair of rotatable wheel hubs, each of which is fixed to an end of the axle.

Anti-lock braking systems, more commonly referred to as ABS, are increasingly common safety equipment on every type of vehicle ranging from automobiles to heavy-duty vehicles. In heavy-duty vehicles such as straight trucks and semi-trailers, minimum government regulations require at least one axle of tandem axles that are commonly found on such vehicles, to include an ABS sensor on each end of that axle. Some manufacturers of heavy-duty vehicles go beyond minimum government regulations and include ABS on every axle to improve ABS performance.

Each ABS includes a sensor that must be precisely located adjacent to a tone ring. The tone ring can be attached directly to an inboard end of a wheel hub or can be incorporated into a disc brake rotor. More specifically, the tone ring is circular and is formed with notches, protrusions, teeth, or similar divisions, and rotates with the wheel hub or disc brake rotor to which it is attached or integrated. As is known, the ABS sensor detects certain movements of the tone ring teeth as the tone ring moves past the ABS sensor, which in turn causes an electrical signal to be sent to an ABS electronic control unit enabling control of brake engagement. Thus, it is very important that the ABS sensor be precisely positioned on the vehicle axle adjacent to, and aligned with, the tone ring teeth so that the ABS sensor can properly perform its sensing function over an anticipated service life.

Most prior art ABS sensor brackets which attach to the axle and position the ABS sensor adjacent to the tone ring were constructed in one of several ways. Specifically, the prior art brackets were typically cast, formed from heavy blocks of metal by machining, made from multiple parts which required fabrication and welding to form the bracket, or formed from a single piece of sheet metal and formed into a specific shape and welded. Each of these methods of forming an ABS sensor bracket can be relatively expensive. Moreover, a custom bracket design generally was required for each application having a different wheel hub and/or axle spindle configuration. For example, one custom bracket design might be required for a tapered spindle and another design for a straight spindle.

One such prior art ABS sensor bracket design is shown and described in U.S. Pat. No. 7,559,521. That prior art ABS sensor bracket is formed from a single piece of sheet metal, such as steel, and is formed into a tubular configuration with feet for attaching the prior art ABS sensor bracket to the axle. While generally suitable for its intended purpose, the sheet metal prior art ABS sensor bracket may be susceptible to damage. The damage may include bending or deformation from being struck by road debris which may result in less than optimum support and location of the ABS sensor. Furthermore, the design of the prior art ABS sensor bracket may allow debris to accumulate in certain spaces of the bracket which may later dislodge and damage the ABS sensor or tone ring.

Therefore, there is a need for an improved ABS sensor bracket that can overcome the disadvantages and drawbacks of the prior art ABS sensor brackets. The improved ABS sensor bracket of the invention may deflect road debris away from the ABS sensor bracket and have a lesser chance of debris accumulating on the bracket. The improved ABS sensor bracket also is more robust and strong, improves consistent location and support of the ABS sensor, provides good weldability of the bracket to the axle, and may be less costly when compared to prior art ABS sensor brackets. The improved bracket for an ABS sensor satisfies this need, as will be described below.

SUMMARY

A summary is provided to introduce concepts of the invention. This summary is not intended to identify key factors or essential features of the invention, nor is it intended to limit the scope of the invention.

The invention is directed to mounting an anti-lock braking system sensor, which also may be referred to as an "ABS" sensor, on an axle and at a precise and consistent location adjacent to a tone ring. In particular, the invention is directed to mounting the ABS sensor on an axle of a heavy-duty vehicle such as a semi-trailer or straight truck. More particularly, the invention is directed to an improved ABS sensor bracket that includes a debris deflecting configuration and is formed of powdered metal (PM), which provides a configuration that is rigid and stable. The improved ABS sensor bracket also improves precise support of the ABS sensor for a relatively long duration, provides good weldability of the bracket to the axle, and provides a reduction of cost when compared to prior art ABS sensor brackets.

An improved anti-lock braking system bracket, according to one aspect of the invention, is for precisely mounting an anti-lock braking system sensor to a vehicle, such as a heavy-duty vehicle, axle adjacent to a tone ring. The anti-lock braking system bracket includes a substantially tubular body portion or tube section with a surface defining an opening for receiving and supporting the anti-lock braking system sensor. The anti-lock braking system bracket includes a pair of legs, each of which depends from the tubular body portion. The anti-lock braking system bracket also includes a pair of feet, each of which define an end portion of a respective one of the pair of legs. Each of the pair of feet is for contacting an exterior surface of the axle. The tubular body portion, the pair of legs and the pair of feet are integrally formed as one-piece.

The bracket may be formed from powdered metal. The bracket may be fixed to the axle by welding. A pair of side surfaces define each of the pair of legs. Each of the pair of side surfaces may extend at an acute angle from the body portion. An arcuate surface defines an end of each of the pair of feet and extends between a respective pair of side surfaces of the legs. Each arcuate surface has a shape closely matching an exterior surface of the axle to which the pair of feet are mounted.

The tubular body portion extends along a longitudinal central axis of the improved anti-lock braking system bracket. The tubular body portion may have an axial extent greater than or equal to the axial extent of the pair of legs. A pair of axial end surfaces define a respective axial extent of each of the pair of legs. One of the pair of axial end surfaces of the legs may be offset from an end surface of the tubular body portion. The pair of axial end surfaces of the legs may be equally offset from respective axially opposite end surfaces of the tubular body portion. At least one respective axial end surface may extend substantially coplanar with at least one axial end surface of the tubular body portion.

DRAWINGS

The following description and drawings set forth certain illustrative aspects, embodiments and implementations of the invention. The drawings are indicative of various ways in which one or more aspects, embodiments or implementations may be employed. Further features of the invention will become apparent to those skilled in the art from reading the following description with reference to the accompanying drawings, in which.

DESCRIPTION

The invention is described with reference to the drawings, in which like reference numerals are used to refer to like elements throughout the description and drawings. For exemplary purposes, details are set forth in order to provide an understanding of the invention. It will be understood, however, that the concepts of the invention can be practiced and implemented without these specific details.

Figure 1:
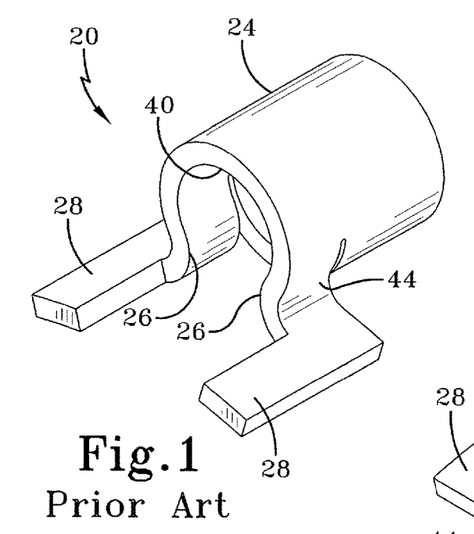
FIG. 1 is a perspective view from an inboard end of a prior art anti-lock braking system sensor bracket for use with a heavy-duty vehicle.
Figure 2:
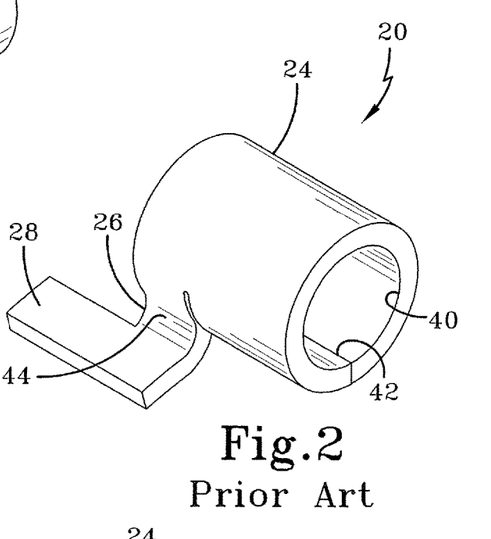
FIG. 2 is a perspective view from an outboard end of the prior art anti-lock braking system sensor bracket illustrated in FIG. 1.
Figure 3:
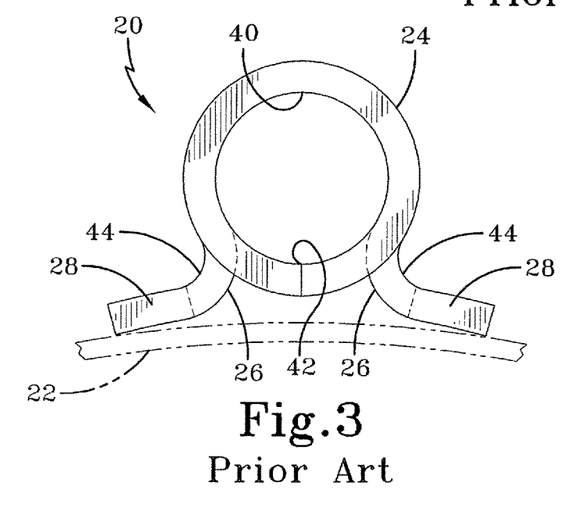
FIG. 3 is an outboard end view of the prior art anti-lock braking system sensor bracket illustrated in FIG. 2 and disposed on a portion of an axle with hidden parts of the bracket shown broken lines and the portion of the axle shown in dot-dash lines.
Figure 4:
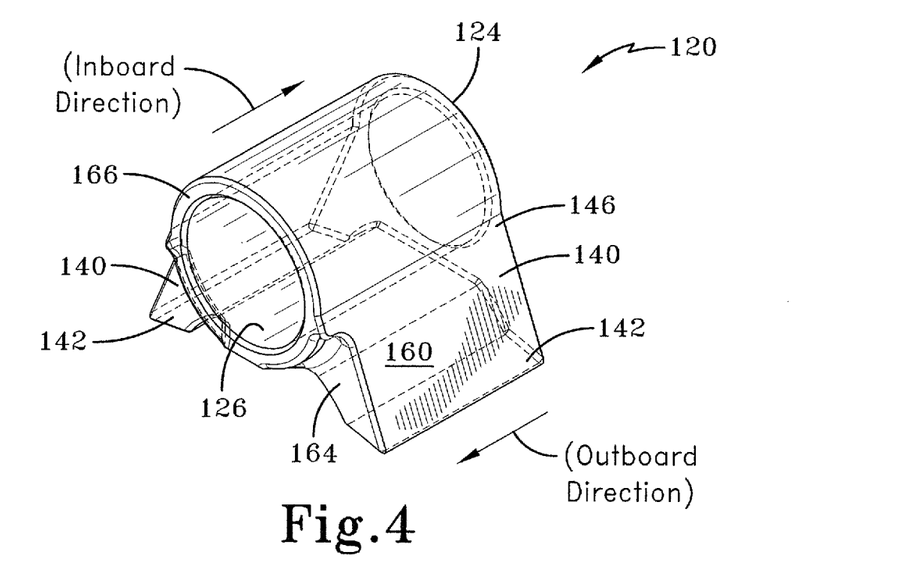
FIG. 4 is a perspective view from an outboard end of an anti-lock braking system sensor bracket for use with a heavy-duty vehicle according to one aspect of the invention, with hidden parts shown in phantom lines.
Figure 5:
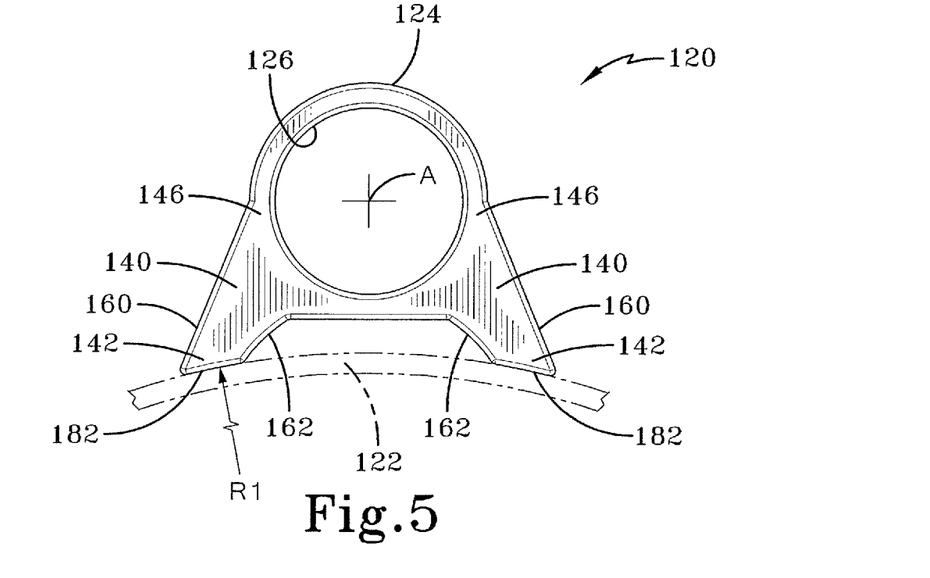
FIG. 5 is an inboard end view of the anti-lock braking system sensor bracket illustrated in FIG. 4 and disposed on a portion of an axle with hidden parts of the bracket shown broken lines and the portion of the axle shown in dot-dash lines.

In order to better understand the structure and function of the improved bracket for an anti-locking braking system (ABS) sensor for use on heavy-duty vehicles of the invention, components of a prior art bracket for an ABS sensor are shown in FIGS. 1-3 and described. As is known, heavy-duty vehicles include trucks and tractor-trailers or semi-trailers. The tractor-trailers or semi-trailers may be equipped with one or more trailers.

One or more axles typically depend from and extend transversely across a heavy-duty vehicle. Each axle has a pair of opposite ends. One of a pair of wheel end assemblies is fixed to a respective one of the ends of the axle. For the purposes of convenience and clarity, only one end of the axle and the respective wheel end assembly will be described. It will be appreciated that the description of only one end of the axle and wheel end assembly will equally apply to both ends of the axle and for both ends of multiple axles.

One prior art ABS sensor bracket is indicated generally at 20 and illustrated in FIGS. 1-3. The prior art ABS sensor bracket 20 is shown and described in U.S. Pat. No. 7,559, 521 which is assigned to the present assignee. The prior art ABS sensor bracket 20 attaches to an axle 22 (FIG. 3) and positions an ABS sensor (not shown) adjacent to a tone ring (not shown). The ABS sensor is received in, and retained by, a tubular portion 24 of the ABS sensor bracket 20. It is important that the ABS sensor remains precisely positioned relative to the tone ring over its intended service life in order to provide accurate and useful information to the ABS system.

The prior art ABS sensor bracket 20 is formed from a single flat piece of sheet metal material cut to a desired pattern and formed into the configuration illustrated in FIGS. 1-3. The prior art ABS sensor bracket 20 includes the tubular portion 24 and a pair of spaced apart legs 26 in which each of the legs depends from the tubular portion. Each leg 26 is formed with a foot 28 that extends in a direction away from the tubular portion 24.

The tubular portion 24 is formed into a continuous and substantially circular structure having a surface defining a continuous opening 40 extending axially therethrough. The tubular portion 24 has opposed and lower (as viewed in FIGS. 2 and 3) edges joined at a seam 42, preferably by welding. The prior art ABS sensor bracket 20 is then fixed to the axle 22 of the heavy-duty vehicle by welding or by a band clamp (not shown), as is known.

The prior art ABS sensor bracket 20 has at least one possible disadvantage, in that it may be susceptible to damage from contact with road debris, such as ice, snow, rocks and/or dirt. The prior art ABS sensor bracket 20 may be damaged, for example by being dented or bent, by contact with the road debris. This damage may re-orient or re-position the ABS sensor relative to the tone ring and, therefore, the ABS sensor may provide no or less than reliable and optimal information to the ABS system. This damage could render the ABS system unreliable or unusable and put the heavy-duty vehicle out of service. Also, the prior art ABS sensor bracket 20 may catch and retain road debris in a curved region 44 formed by the legs 26 or between the axle 22 and the tubular portion 24 in between the legs 26. Over time and due to operating the heavy-duty vehicle, this retained road debris may dislodge and find its way between the sensor and the tone ring and could damage the ABS sensor, the tone ring and/or interfere with obtaining a reliable signal from the ABS sensor.

Therefore, it is desirable to provide an improved ABS sensor bracket that is robust, strong enough to avoid or minimize damage from being struck by road debris, capable of deflecting road debris, eliminates or minimizes regions that could collect road debris, and provides good weldability to an axle in order to improve support and location of the ABS sensor over an extended service life duration. The improved bracket for an ABS sensor of the invention satisfies this need.

Thus, an improved anti-locking braking system (ABS) sensor bracket 120, according to one aspect of the invention is illustrated in FIGS. 4-8 and described below. The ABS sensor bracket 120 is provided for receiving, supporting and operatively mounting an ABS sensor (not shown) on an axle 122 (FIG. 5) of a vehicle, such as a heavy-duty vehicle. The improved ABS sensor bracket 120 may be fixed to the axle 122 of the heavy-duty vehicle adjacent to a tone ring (not shown). The axle 122 may be of any suitable design for its intended use and have an appropriate outer diameter, such as 5.00 inches or 5.75 inches, and an appropriate wall thickness, such as in the range of about 0.300 inch to about 0.500 inch.

The ABS sensor bracket 120 includes a sensor support or tube section 124. The tube section 124 is a tubular body portion structure extending along a longitudinal central axis A of the ABS sensor bracket 120. The ABS sensor is received in a substantially cylindrical surface defining an opening 126 of tube section 124. The ABS sensor is retained within the opening 126 of tube section 124 by any suitable means, as is known. The tube section 124 may be completely enclosed for the entire axial extent TL1 (FIG. 7) of the ABS sensor bracket 120. The ABS sensor bracket 120 includes a continuous solid wall of a mostly constant thickness, thereby providing improved support and protection of the ABS sensor.

The ABS sensor bracket 120 also includes a pair of legs 140. Each one of the pair of legs 140 extends angularly outward from the tube section 124. The pair of legs 140 are spaced apart in a circumferential direction relative to the axle 122. Each of the pair of legs 140 includes an upper transition portion 146 that smoothly joins with tube section 124 substantially along the entire axial extent L1 (FIG. 7) of the legs.

In this aspect, the axial extent L1 of each of the legs 140 may be slightly less than the axial extent TL1 of the tube section 124 of the ABS sensor bracket 120. It will be apparent, however, that axial extent L1 of each of the legs 140 may be equal to the axial extent TL1 of the tube section 124. In one aspect, the outboard end surfaces 164 (FIGS. 4 and 7-8) of each of the pair of legs 140 may be axially offset from the outboard end surface 166 of the tube section 124 by a distance O1. The inboard end surfaces 180 each of the pair of legs 140, axially opposite the outboard end surfaces 164, may be coplanar with an end surface 168 of the tube section 124. It will also be apparent that both the outboard and inboard end surfaces 164, 180 of the legs 140 may be offset from the respective end surfaces 166, 168 of the tube section 124. If the outboard and inboard end surfaces 164, 180 of each of the pair of legs 140 are offset from the respective end surfaces 166, 168 of the tube section 124, the offsets may be equal or of different offset dimensions. It will also be appreciated that outboard and inboard end surfaces 164, 180 of each of the pair of legs 140 may be coplanar with respective end surfaces 166,168 of the tube section 124.

Each leg 140 also includes a lower or bottom (as viewed in FIGS. 5-6) portion or foot 142 that seats on axle 122. Each foot 142 is provided to contact and attach to an exterior surface of the axle 122. Each foot 142 may be fixed to the axle 122 by any suitable means, for example by welding. Each foot 142 is spaced from the other foot in a circumferential direction when attached to the axle 122. Each of the pair of legs 140 is defined by a pair of substantially planar outer and inner wall surfaces 160, 162 (FIGS. 5-6) each of which extend at an acute angle from the tube section 124 relative to a line or plane P extending between the feet 142 of the ABS sensor bracket 120. Thus, the legs 140 are relatively thick which enhances rigidity and stability of the ABS sensor bracket 120.

Each foot 142 may include an arcuate surface 182 (FIG. 5) that forms an end of each foot over the entire axial extent L1 of each foot and leg 140. Each arcuate surface 182 has a shape or radius R1 that closely matches a tubular exterior surface of the axle 122 to provide a relatively large area of contact with the axle to stabilize the ABS sensor bracket 120. It will be apparent that each of the feet 142 of the ABS sensor bracket 120 may include a slot or portion that extends axially in the inboard direction away from the tube section 124 for accepting attachment structure (not shown), such as a band clamp as is known.

Figure 6:
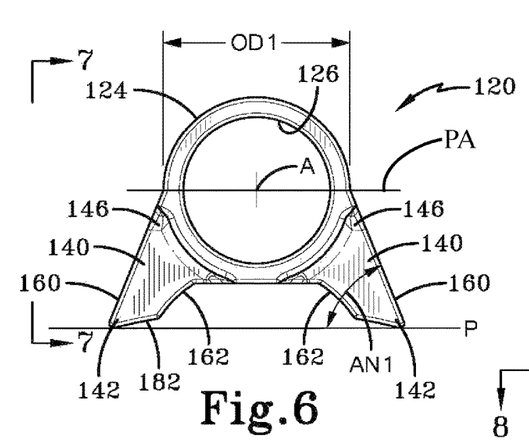
FIG. 6 is an outboard end view of the anti-lock braking system sensor bracket illustrated in FIG. 4.
Figure 7:
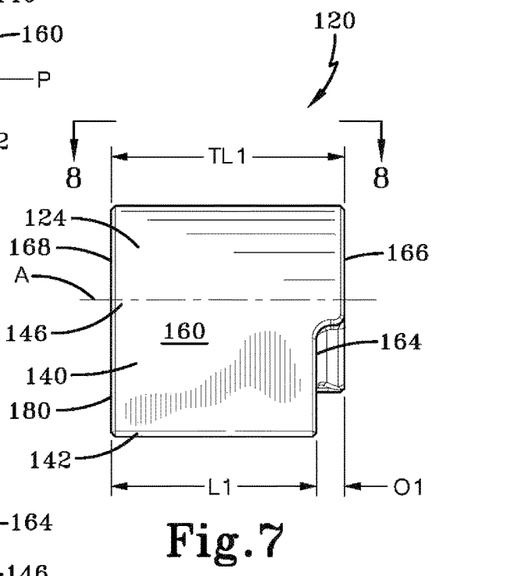
FIG. 7 is a side elevational view of the anti-lock braking system sensor bracket Illustrated in FIG. 6, taken approximately along the line 7-7 of FIG. 6.
Figure 8:
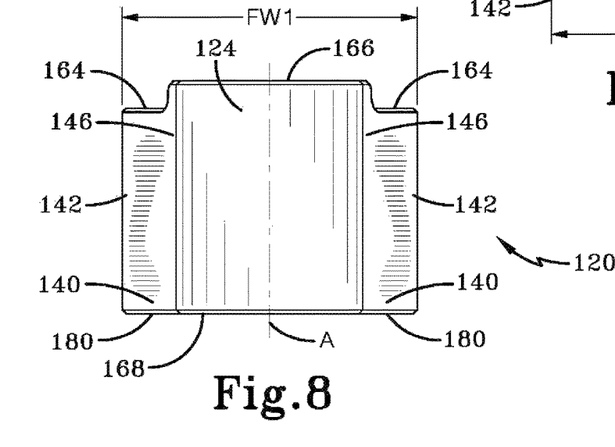
FIG. 8 is a top plan view of the anti-lock braking system sensor bracket illustrated in FIG. 7, taken approximately along the line 8-8 of FIG. 7.
Figure 9:
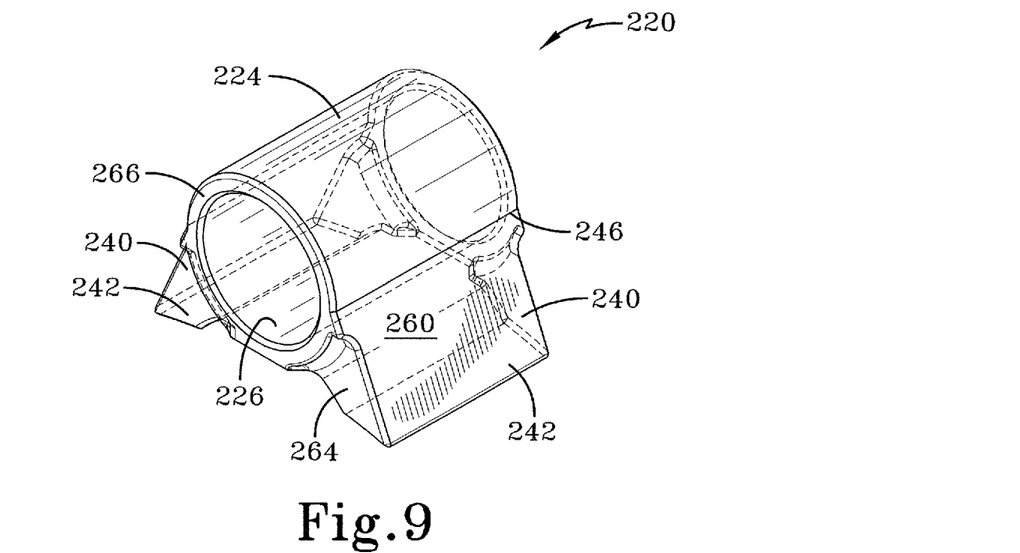
FIG. 9 is a perspective view from an outboard end of an anti-lock braking system sensor bracket for use with a heavy-duty vehicle according to another aspect of the invention, with hidden parts shown in phantom lines.
Figure 10:
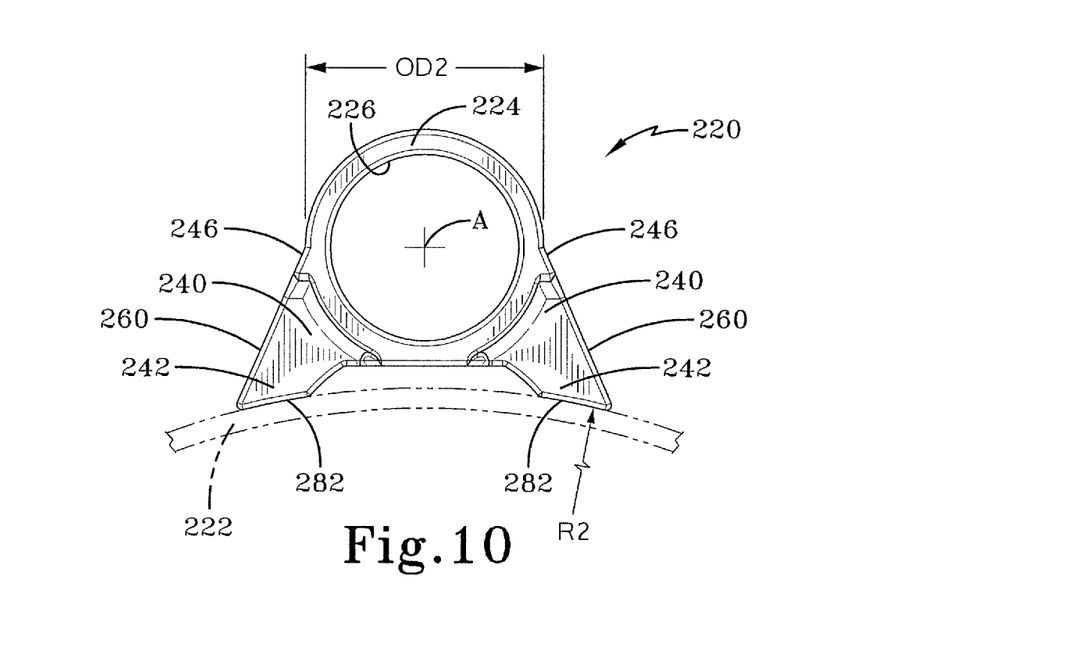
FIG. 10 is an inboard end view of the anti-lock braking system sensor bracket illustrated in FIG. 9 and disposed on a portion of an axle that is shown in dot-dashed lines.
Figure 11:
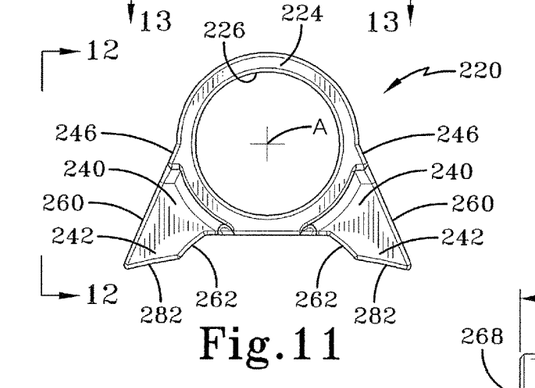
FIG. 11 is an outboard end view of the anti-lock braking system sensor bracket illustrated in FIG. 9.
Figure 12:
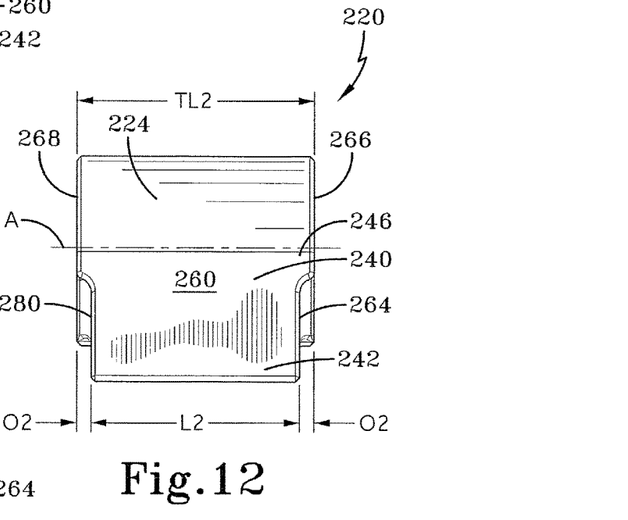
FIG. 12 is a side elevational view of the anti-lock braking system sensor bracket illustrated in FIG. 11, taken approximately along the line 12-12 of FIG. 11.
Figure 13:
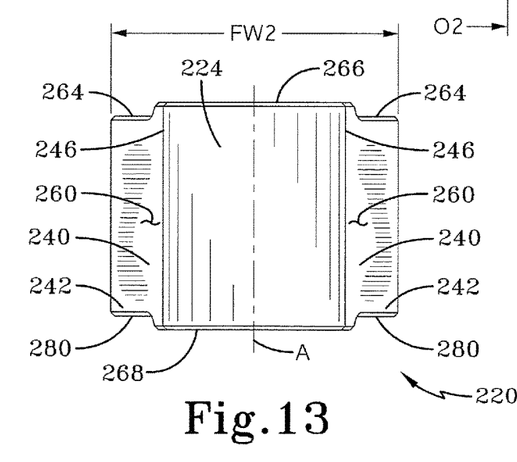
FIG. 13 is a top plan view of the anti-lock braking system sensor bracket illustrated in FIG. 11, taken approximately along the line 13-13 of FIG. 11.
Figure 14:
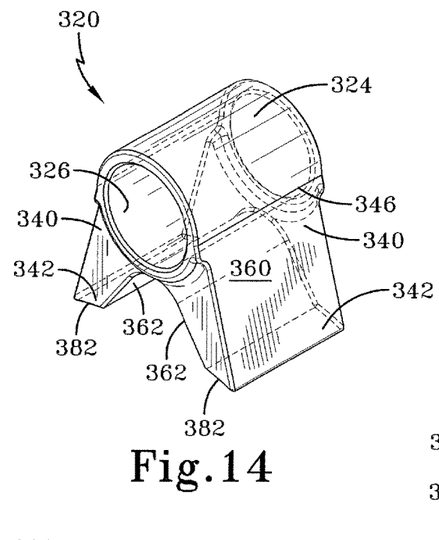
FIG. 14 is a perspective view from an outboard end of an anti-lock braking system sensor bracket for use with a heavy-duty vehicle according to yet another aspect of the invention, with hidden parts shown in phantom lines.
Figure 15:
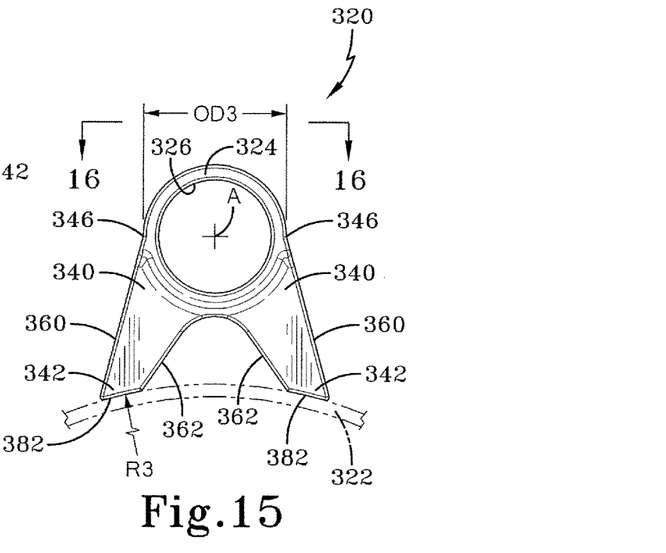
FIG. 15 is an end view of the anti-lock braking system sensor bracket illustrated in FIG. 14 and disposed on a portion of an axle that is shown in dot-dashed lines.
Figure 16:
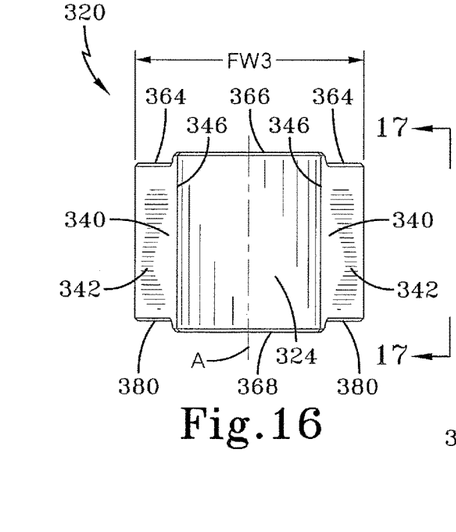
FIG. 16 is a top plan view of the anti-lock braking system sensor bracket illustrated in FIG. 15, taken approximately along the line 16-16 of FIG. 15.

Each leg 140 is angled in an outward and downward, as viewed in FIG. 6, direction from each respective upper transition portion 146 to each respective lower portion or foot 142. Thus, a foot width FW1 of the ABS sensor bracket 120 at the feet 142 is wider than an outer diameter OD1 of the tube section 124 to further stabilize the bracket with a relatively wide stance. An outer wall surface 160 of each respective leg 140 extends from the tube section 124 at an angle AN1 measured from the plane P extending across the base of the ABS sensor bracket 120. The outer wall surfaces 160 may be substantially planar. The outer wall surfaces 160 may also be oriented, when fixed to the axle 122, to angle into and away from, respectively, the direction of travel of the heavy-duty vehicle.

By way of example, the angle AN1 may be in the range of about 55° to about 80° and preferably in the range of about 65° to about 70°. Such an angle AN1 enables an exemplary foot width FW1 (FIG. 8) at the feet 142 in the range from about 1.3 inches to about 1.7 inches and preferably in the range from about 1.43 inches to about 1.53 inches when fixed to an axle 122 having an outer diameter of about 5.75 inches. This foot width FW1 may have a ratio of foot width FW1 to the outside diameter of the axle 122 in the range from about 0.226 to about 0.295 and preferably in the range from about 0.248 to about 0.266 respectively. Such a relatively wide foot width FW1 provides a stable attachment base for the ABS sensor bracket 120 when compared to the prior art ABS sensor bracket 20 illustrated in FIGS. 1-3.

The ABS sensor bracket 120, thus, has a wedge-shape, or angled, configuration due to the angled outer wall surfaces 160 of the legs 140 blending smoothly into the tube section 124 when attached to the axle 122. Each outer wall surface 160 connects smoothly into the tube section 124 of the ABS sensor bracket 120 at the respective upper transition portion 146 at a relatively shallow angle. An upper (as viewed in FIG. 6) or end portion of the outer wall surface 160 of at least one leg 140, such as transition portion 146, is distal from a foot 142 of the leg. The transition portion 146 is attached to the tube section 124 at or adjacent a plane PA extending through the longitudinal central axis A of the tube section. The plane PA extends parallel to the plane P between end portions of the pair of feet 142. The resultant or wedge-shaped configuration resulting from the angled outer wall surfaces 160 of each respective leg 140 of the ABS sensor bracket 120 enables the ABS sensor bracket to deflect road debris, thereby decreasing potential damage to the bracket and the ABS sensor. The design also provides a structure of the ABS sensor bracket 120 with little or no spaces where road debris may collect. The wedge-shaped design further provides a more robust configuration for the ABS sensor bracket 120, which makes the ABS sensor bracket stronger and more able to resist damage than the prior art bracket 20 illustrated in FIGS. 1-3. Such a rigid and stable bracket 120 is enabled by the relatively wide foot width FW1 of the spaced apart pair of legs 140 on the axle 122, coupled with the angled orientation of the outer wall surfaces 160 and relatively stronger construction of the legs extending from tube section 124. It will be appreciated that the outer wall surfaces 160 may connect with the tube section 124 at different angles.

The ABS sensor bracket 120 may be integrally formed as one-piece. That is, the tube section 124, the pair of legs 140 and the pair of feet 142 may be integrally formed at the same time as one-piece from a suitable powdered metal, such as an Iron Nickel based material. By way of example, a suitable powdered metal material may include about 2 wt % Nickel, less that about 0.3 wt % Carbon and about 96 wt % Iron. Forming the ABS sensor bracket 120 from powdered metal provides a rigid and stable ABS sensor bracket when compared the prior art bracket 20 illustrated in FIGS. 1-3. Forming the ABS sensor bracket 120 from powdered metal provides a nearly finished part that does not require any finish machining. The inclusion of Nickel in the powdered metal composition provides good weldability of the ABS sensor bracket to axle 122. In addition, forming the ABS sensor bracket 120 from powdered metal may eliminate some fabrication operations, thereby potentially decreasing the cost of the ABS sensor bracket 120 when compared to prior art bracket 20 illustrated in FIGS. 1-3.

In this manner, the improved ABS sensor bracket 120 of the invention includes a wedge-shaped configuration and is formed of powdered metal. Thus, the ABS sensor bracket 120 may deflect road debris, eliminate spaces where road debris may collect, provides a rigid and stable bracket shape, improves support of the ABS sensor, provides good weldability of the bracket to the axle, and provides a potential reduction of manufacturing cost when compared to prior art ABS sensor brackets, such as the ABS sensor bracket 20 illustrated in FIGS. 1-3. The relatively wide foot width FW1 of the spaced apart pair of legs 140 on the axle 122 provides a stable base for the ABS sensor bracket 120.

Turning to FIGS. 9-13, another aspect of an improved ABS sensor bracket for an ABS sensor of the invention is indicated generally at 220. The ABS sensor bracket 220 is for operatively mounting an ABS sensor on an axle 222 (FIG. 10) of a heavy-duty vehicle. The ABS sensor bracket 220 is similar in construction and function as the ABS sensor bracket 120 illustrated in FIGS. 4-8 and described above, with one exception. Thus, the ABS sensor bracket 220 includes the same general structure, features and advantages of the ABS sensor bracket 120. Therefore, the improved ABS sensor bracket 220 of the invention includes a wedge-shaped configuration and is formed of powdered metal, which enables the bracket to deflect road debris, eliminates regions that may collect debris, provides a rigid and stable bracket shape, improves support of the ABS sensor, provides good weldability of the bracket to the axle, and provides a reduction of cost when compared to prior art ABS sensor brackets, such as bracket 20 illustrated in FIGS. 1-3.

The ABS sensor bracket 120 illustrated in FIG. 4-8 includes the inboard end surface 168 of tube section 124 being flush or coplanar with the inboard end surface 180 of the legs 140, while the outboard surface 166 of the tube section protrudes slightly past the outboard end surface 164 of the legs. The ABS sensor bracket 220 according to this aspect includes a substantially symmetrical configuration, in which the inboard surface 268 of the tube section 224 protrudes slightly outward of inboard end surfaces 280 of the legs 240. An outboard end surface 266 of the tube section 224 protrudes slightly outward of outboard end surfaces 264 of legs 240. Thus, since the ABS sensor bracket 220 is symmetrically offset, there is not inboard and outboard, per se, orientations. Inboard and outboard will be used herein merely to refer orientation when attached to the axle 222.

The ABS sensor bracket 220 includes a sensor support or tube section 224. The tube section 224 is formed into a substantially tubular body portion structure having a substantially cylindrical surface defining an opening 226 extending along a longitudinal central axis A. The ABS sensor (not shown) is received in the opening 226 of tube section 224. The ABS sensor is retained within the opening 226 of tube section 224 by any suitable means.

The ABS sensor bracket 220 also includes the pair of legs 240. Each one of the pair of legs 240 extends angularly outwardly from the tube section 224. Each of the pair of legs 240 is defined by a pair of substantially planar surfaces 260, 262 (FIG. 11) that extend at an acute angle from the tube section 224. The pair of legs 240 are spaced apart in a circumferential direction when attached to the axle 222. Each of the pair of legs 240 includes an upper transition portion 246 that smoothly joins with tube section 224 substantially along the entire length TL2 (FIG. 12) of the ABS sensor bracket 220. In this aspect, the axial extent L2 of each of the legs 240 is slightly less than the axial extent or length TL2 of the tube section 224 of the ABS sensor bracket 220. Both of inboard and outboard end surfaces 264, 280 of each of the pair of legs 240 may be offset from the respective end surfaces 266, 268 of the tube section 224 a distance O2. It will be apparent that the offset of the inboard and outboard end surfaces of each of the pair of legs 140 may be equally offset or of different offset dimensions.

Each leg 240 also includes a lower or bottom (as viewed in FIGS. 10-11) portion or foot 242 that seats on the axle 222. Each foot 242 is provided to contact and attach to an exterior surface of the axle 222. Each foot 242 may be fixed to the vehicle axle 222 by any suitable means, for example by welding. Each foot 242 is spaced from the other foot in a circumferential direction when attached to the axle 222. Each leg 240 is angled in an outward direction from each respective upper transition portion 246 to each respective lower portion or foot 242. Thus, a foot width FW2 (FIG. 13) of the ABS sensor bracket 220 at the feet 242 is wider than the outer diameter OD2 (FIG. 10) of the tube section 224. Such relatively wide foot width FW2 provides a stable attachment base for the ABS sensor bracket 220. Each foot 242 has an arcuate surface 282 extending between respective surfaces 260, 262 of one the legs 240 of the tube section 224 defining the end of the leg. Each arcuate surface 282 has a shape or radius R2 (FIG. 10) that closely matches a tubular exterior surface of the axle 222.

The ABS sensor bracket 220, thus, has a wedge-shaped, or angled, configuration due to orientation of the surfaces 260 of the legs 240 when attached to the axle 222. The outer wall surface 260 connects smoothly into the tube section 224 of the ABS sensor bracket 220. The resultant or wedge-shaped configuration provided by the outer wall surfaces 260 of each respective leg 240 of the ABS sensor bracket 220 enables the ABS sensor bracket to deflect road debris, thereby decreasing potential damage to the bracket and the ABS sensor. The design also provides a structure of the ABS sensor bracket 220 with little or no spaces where road debris may collect. The wedge-shaped configuration also provides a more robust configuration for the ABS sensor bracket 220, which makes the ABS sensor bracket stronger and more resistant to damage, provides good weldability of the sensor bracket to the axle 222, and provides a reduction of cost when compared to the prior art bracket 20 illustrated in FIGS. 1-3. The relatively wide foot width FW2 of the spaced apart pair of legs 240 on the axle 222 provides a stable base for the ABS sensor bracket 220.

The ABS sensor bracket 220 may be integrally formed as one-piece. That is, the tube section 224, the pair of legs 240 and the pair of feet 242 may be integrally formed as one-piece from powdered metal. Forming the ABS sensor bracket 220 from powdered metal also may provide a nearly finished part that may not require any finish machining, thereby potentially decreasing the cost of the ABS sensor bracket 220 when compared to prior art bracket 20 illustrated in FIGS. 1-3.

Yet another aspect of the improved ABS sensor bracket for an improved ABS sensor bracket of the invention is indicated generally at 320 and illustrated in FIGS. 14-17. The ABS sensor bracket 320 is for operatively mounting an ABS sensor with an axle 322 of the heavy-duty vehicle. The ABS sensor bracket 320 is similar in construction and function as the ABS sensor brackets 120 and 220 illustrated in FIGS. 4-13.

The ABS sensor bracket 320 is substantially the same in construction and operation as the ABS sensor bracket 220 illustrated in FIGS. 9-13, with one exception. That is, the ABS sensor bracket 320 has a pair of legs 340 that are relatively longer than the legs 240 of the ABS sensor bracket 220.

The ABS sensor bracket 320 is intended for use on an axle 322 that has a relatively smaller outside diameter than axle 222, such as 5.00 inches. The ABS sensor bracket 320 locates the ABS sensor at about the same distance from the centerline of the axle 322 as the ABS sensor bracket 120 or 220 locates the ABS sensor from the centerline of the axle 122, 222. This permits the same tone ring to be used with different diameters of the axles 122, 222, 322 and the ABS sensor will be properly positioned to sense speed of the tone ring as it rotates.

Thus, the ABS sensor bracket 320 is substantially the same in construction and operation as the ABS sensor bracket 220, illustrated in FIGS. 9-13, with the exception of the above-described longer leg 340 feature. The ABS sensor bracket 320 includes the same general structure and advantages of the ABS sensor bracket 120 or 220. That is, the ABS sensor bracket 320 of the invention includes a wedge-shaped configuration and is formed of powdered metal, enables the bracket to deflect road debris, eliminates spaces where road debris may collect, provides a rigid and stable bracket shape, improves support of the ABS sensor, provides good weldability of the bracket to the axle, and provides a potential reduction in manufacturing cost when compared to prior art ABS sensor brackets, such as bracket 20 illustrated in FIGS. 1-3.

The ABS sensor bracket 320 includes a sensor support or tube section 324. The tube section 324 is formed into a substantially tubular body portion structure having a substantially cylindrical surface defining an opening 326 extending along a longitudinal central axis A. The ABS sensor (not shown) is received in the opening 326 of tube section 324. The ABS sensor is retained within the opening 326 of tube section 324 by any suitable means. The tube section 324 is completely enclosed for the entire axial extent or length TL3 (FIG. 17) of the ABS sensor bracket 320.

The ABS sensor bracket 320 also includes a pair of legs 340, each one of the pair of legs extends angularly outward from the tube section 324. Each of the pair of legs 340 is defined by a pair of substantially planar surfaces 360, 362 (FIG. 15) that extend at an acute angle from the tube section 324. The pair of legs 340 are spaced apart in a circumferential direction when attached to the axle 322. Each of the pair of legs 340 includes an upper transition portion 346 that joins with tube section 324 substantially along the entire length TL3 (FIG. 17) of the ABS sensor bracket 320.

Figure 17:
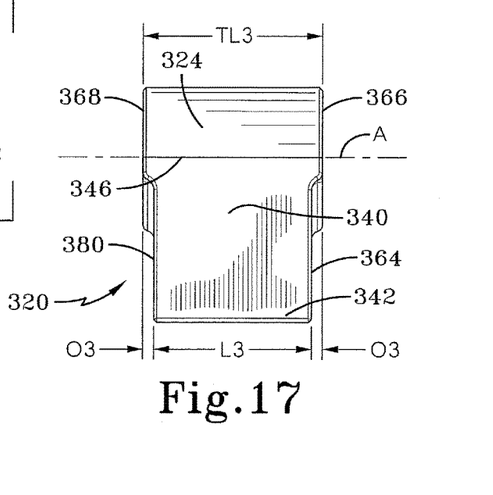
FIG. 17 is a side elevational view of the anti-lock braking system sensor bracket illustrated in FIG. 16, taken approximately along the line 17-17 of FIG. 16.

In this aspect, the axial extent L3 of each of the legs 340 is slightly less that the axial extent or length TL3 of the tube section 324 of the ABS sensor bracket 320. Both of the inboard and outboard end surfaces 364, 380 of each of the pair of legs 340 may be offset from the respective inboard and outboard end surfaces 366, 368 of the tube section 324 by a distance O3. It will also be apparent that the offset of the inboard and outboard end surfaces 364, 380 of each of the pair of legs 340 may be equally offset or of different offset dimensions. It will also be appreciated that one or both of the end surfaces 364, 380 of the legs 340 could be flush or coplanar with a respective end surface 366 or 368 of the tube section 324.

Each leg 340 also includes a lower or bottom (as viewed in FIGS. 10-11) portion or foot 342 that seats on the axle 322. Each foot 342 is provided to contact and attach to an exterior surface of the axle 322. Each foot 342 may be fixed to the vehicle axle 322 by any suitable means, for example by welding. Each leg 340 is angled in an outward direction from each respective upper transition portion 346 to each respective lower portion or foot 342.

Each foot 342 is spaced from the other foot in a circumferential direction when attached to the axle 322. Thus, a foot width FW3 (FIG. 16) of bracket 320 at the feet 342 is wider than the outer diameter OD3 (FIG. 15) of the tube section 324. The foot width FW3 is approximately the same as foot width FW1 or FW2. Each foot 344 has an arcuate surface 382 forming an end of each of the legs 340. Each arcuate surface 382 has a shape or radius R3 that closely matches a tubular exterior surface of the axle 322.

The outer wall surfaces 360 may be substantially planar. The outer wall surfaces 360 may be oriented to angle substantially into and away from, respectively, the direction of travel of the heavy-duty vehicle, when fixed to the axle 322. The ABS sensor bracket 320, thus, has a wedge-shaped, or angled, configuration resulting from the angled surfaces 360 of the legs 340 when attached to the axle 322. The outer wall surface 360 connects smoothly into the tube section 324 of the ABS sensor bracket 320 at transition portion 346. The resultant smooth wedge-shaped configuration resulting from the angled orientation of the outer wall surfaces 360 of each respective leg 340 of the ABS sensor bracket 320 enables the ABS sensor bracket to deflect and withstand road debris, thereby decreasing potential damage to the bracket and the ABS sensor. The configuration of the ABS sensor bracket 320 also provides a structure with little or no spaces where road debris may collect. The wedge-shaped design also provides a more rigid configuration for the ABS sensor bracket 320, which makes the ABS sensor bracket more stable and resistant to deformation, provides good weldability of the sensor bracket to the axle 322, and provides a reduction of cost when compared to the prior art bracket 20 illustrated in FIGS. 1-3. Such rigidity and stability is enabled by the relatively wide foot width FW3 and thicknesses of the spaced apart pair of legs 340 on the axle 322, coupled with the angled, stronger configuration of the legs extending from tube section 324.

The ABS sensor bracket 320 may be integrally formed as one-piece from powdered metal. Forming the ABS sensor bracket 320 from powdered metal increases the rigidity and stability through the shape of the ABS sensor bracket when compared the prior art bracket 20 illustrated in FIGS. 1-3. Forming the ABS sensor bracket 320 from powdered metal also may provide a nearly finished part that may not require any finish machining. In addition, forming the ABS sensor bracket 320 from powdered metal may eliminate some fabrication operations, thereby potentially decreasing the cost of the ABS sensor bracket 320 when compared to the prior art bracket 20 illustrated in FIGS. 1-3.

It is to be understood that the powdered metal composition, structure and arrangement of the above-described improved ABS sensor bracket 120, 220, 320 may be modified, altered or rearranged without affecting the overall concept or operation of the invention. In addition, the improved ABS sensor bracket 120, 220, 320 may be employed with other types and sizes of axles and anti-lock braking systems and configurations other than those shown and described above, without affecting the overall concept or operation of the invention. Moreover, while reference herein has been made generally to a heavy-duty vehicle for the purpose of convenience, it is with the understanding that such reference includes trucks, tractor-trailers and semi-trailers, and trailers thereof, and may be extended to other heavy-duty vehicles.

It is understood that the configuration and size of the improved ABS sensor bracket 120, 220, 320 shown and described herein is intended for use with a respective axle 122, 222, 322 having an outside diameter of 5 or 5 and ¾ inches. However, the size of the axle with which the improved ABS sensor bracket 120, 220, 320 is utilized does not affect the overall concept of the invention. It is contemplated that the size and/or shape of the improved ABS sensor bracket 120, 220, 320 can be modified for use with other diameter or shaped axles to similarly properly position an ABS sensor on the axle adjacent to a tone ring.

It is also understood that the improved sensor bracket 120, 220, 320 can be utilized to hold other sensors which perform other functions, such as a vehicle backup sensor, which senses rearward movement of a tone ring and relays that information to an alarm which provides an audible sound and/or visual indication to warn people of the backing vehicle. Two or more additional sensor brackets can be mounted on axle 122, 222, 322 in the same manner as the respective improved ABS sensor bracket 120, 220, 320 without affecting the overall concept of the invention.

The invention has been described with reference to specific aspects, implementations or embodiments. It is understood that this description and illustration is by way of example and not by way of limitation. Potential modifications and alterations will occur to others upon a reading and understanding of the invention, and it is understood that invention include all such modifications, alterations and equivalents.

What is claimed is:

1. A bracket mounting an anti-lock braking system sensor to a vehicle axle adjacent to a tone ring, the bracket comprising:
    a tubular body portion having a longitudinal central axis and a surface defining an opening receiving the anti-lock braking system sensor;
    a pair of legs, each of the pair of legs extending from the tubular body portion, each of the pair of legs defined by an outer wall surface and an inner wall surface;
    wherein the tubular body portion extends along the longitudinal central axis, the tubular body portion having an axial extent at least equal to an axial extent of the pair of legs, the axial extent of the pair of legs being located between the axial extent of the tubular body portion;
    a pair of feet, each of the pair of feet defining an end portion of a respective one of the pair of legs, each of the pair of feet attached to an exterior surface of the vehicle axle; and
    an end portion distal from a foot of the outer wall surface of at least one of the pair of legs, the distal end portion attached to the tubular body portion at or adjacent an intersection of the tubular body portion and a plane extending through the longitudinal central axis and parallel to a plane extending between end portions of the pair of feet.

2. The bracket of claim 1 wherein the bracket is integrally formed as one piece from a powdered metal material.

3. The bracket of claim 1 wherein at least one of the pair of feet is welded to the axle.

4. The bracket of claim 1 further including a pair of side surfaces defining each of the pair of legs, each of the pair of side surfaces extend at an acute angle from the tubular body portion to define a wedge-shaped configuration of the bracket.

5. The bracket of claim 1 further including an arcuate surface defining an end of each of the pair of feet and extending between a respective pair of wall surfaces defining each of the legs, the arcuate surface has a shape closely matching an exterior surface of the axle to which the pair of feet are mounted.

6. The bracket of claim 1 wherein the tubular body portion extends along the longitudinal axis, the tubular body portion having an axial extent greater than or equal to the axial extent of the pair of legs.

7. The bracket of claim 1 further including a pair of axial end surfaces defining the axial extents of the pair of legs, the pair of axial end surfaces being offset from respective axial end surfaces of the tubular body portion.

8. The bracket of claim 1 further including a pair of axial end surfaces defining the axial extents of the pair of legs, at least one respective axial end surface extending substantially coplanar with at least one axial end surface of the tubular body portion.

9. The bracket of claim 1 wherein at least one of each of the pair of legs and each of the pair of feet being formed to accept a band clamp to attach the bracket to the axle.

10. A bracket mounting an anti-lock braking system sensor to a heavy-duty vehicle axle adjacent to a tone ring of the anti-locking braking system, the bracket comprising:
a tubular body portion having a longitudinal central axis and a surface defining an opening therethrough, the opening receiving and positioning the anti-lock braking system sensor;
a pair of legs, each of the pair of legs extending outward from the tubular body portion, each of the pair of legs defined by a substantially planar outer wall surface and a substantially planar inner wall surface;
wherein the tubular body portion extends in a direction along the longitudinal central axis, the tubular body portion having an axial extent at least equal to an axial extent of the pair of legs, the axial extent of the pair of legs being located between the axial extent of the tubular body portion;
a pair of feet, each of the pair of feet forming an end portion of a respective one of the pair of legs, each of the pair of feet attached to an exterior surface of the heavy-duty vehicle axle to position the sensor on the axle adjacent to the tone ring; and
an end portion distal from a foot of the outer wall surface of at least one of the pair of legs, the distal end portion attached to the tubular body portion at or adjacent a plane extending through the longitudinal central axis and parallel to a plane extending between the pair of feet to form a shape that deflects debris and prevents collection of debris between the tubular body portion and the one leg.

11. The bracket of claim 10 wherein the bracket is integrally formed as one piece from powdered metal.

12. The bracket of claim 10 wherein at least one of the pair of feet is welded to the axle.

13. The bracket of claim 10 further including a pair of side surfaces defining each of the pair of legs, each of the pair of side surfaces extend at an acute angle from the tubular body portion to define a wedge-shaped configuration of the bracket.

14. The bracket of claim 10 further including an arcuate surface defining an end defining each of the pair of feet and extending between a respective pair of substantially planar wall surfaces of the legs, the arcuate surface has a shape closely matching an exterior surface of the axle to which the pair of feet are mounted.

15. The bracket of claim 10 wherein the tubular body portion extends along the longitudinal axis, the tubular body portion having an axial extent greater than or equal to the axial extent of the pair of legs.

16. The bracket of claim 10 further including a pair of axial end surfaces defining axial extents of the pair of legs, the pair of axial end surfaces being offset from respective axial end surfaces of the tubular body portion.

17. The bracket of claim 10 further including a pair of axial end surfaces defining axial extents of the pair of legs, at least one respective axial end surfaces extending substantially coplanar with at least one axial end surface of the tubular body portion.

18. The bracket of claim 10 wherein at least one of each of the pair of legs and each of the pair of feet being formed to accept a band clamp to attach the bracket to the axle.

19. A bracket mounting an anti-lock braking system sensor to a vehicle axle adjacent to a tone ring, the bracket comprising:
a tubular body portion having a longitudinal central axis and a surface defining an opening receiving the anti-lock braking system sensor;
a pair of legs, each of the pair of legs extending outwardly from the tubular body portion, each of the pair of legs defined by a substantially planar outer wall surface and a substantially planar inner wall surface;
a pair of feet, each of the pair of feet defining an end portion of a respective one of the pair of legs, each of the pair of feet contacting an exterior surface of the vehicle axle;
wherein the tubular body portion extends in a direction along the longitudinal central axis, the tubular body portion having an axial extent at least equal to an axial extent of the pair of legs, the axial extent of the pair of legs being located between the axial extent of the tubular body portion; and
an end portion distal from a foot of the outer wall surface of at least one of the pair of legs, the distal end portion attached to the tubular body portion at or adjacent a plane extending through the longitudinal central axis and parallel to a plane extending between the pair of feet to deflect debris and prevent the collection of debris between the tubular body portion and the one leg.

20. The bracket of claim 19 wherein the tubular body portion extends along the longitudinal axis, the tubular body portion having an axial extent greater than or equal to the axial extent of the pair of legs.

* * * * *